United States Patent
Kim et al.

(10) Patent No.: US 12,220,957 B1
(45) Date of Patent: Feb. 11, 2025

(54) SUSPENSION SYSTEM FOR VEHICLE

(71) Applicants: Hyundai Motor Company, Seoul (KR); Kia Corporation, Seoul (KR); Seohan Innobility Co., Ltd., Jincheon-gun (KR)

(72) Inventors: Jae Hun Kim, Hwaseong-si (KR); Jin Woo Chun, Seoul (KR); Jae Geun Bang, Hwaseong-si (KR); Seong-Kweon Joo, Hwaseong-si (KR); Jung Min Cho, Seongnam-si (KR)

(73) Assignees: Hyundai Motor Company, Seoul (KR); Kia Corporation, Seoul (KR); Seohan Innobility Co., Ltd., Jincheon-gun (KR)

( * ) Notice: Subject to any disclaimer, the term of this patent is extended or adjusted under 35 U.S.C. 154(b) by 0 days.

(21) Appl. No.: 18/529,483

(22) Filed: Dec. 5, 2023

(30) Foreign Application Priority Data

Aug. 10, 2023 (KR) .......................... 10-2023-0104902

(51) Int. Cl.
*B60G 11/18* (2006.01)
*B60G 7/00* (2006.01)
*B60G 17/02* (2006.01)

(52) U.S. Cl.
CPC ............ *B60G 11/181* (2013.01); *B60G 7/001* (2013.01); *B60G 17/025* (2013.01); *B60G 2200/156* (2013.01); *B60G 2202/132* (2013.01); *B60G 2206/124* (2013.01); *B60G 2206/42* (2013.01)

(58) Field of Classification Search
CPC .... B60G 11/181; B60G 7/001; B60G 17/025; B60G 2200/156; B60G 2202/132; B60G 2206/124; B60G 2206/42
See application file for complete search history.

(56) References Cited

U.S. PATENT DOCUMENTS 5,158,321 A * 10/1992 Maul .................... B60G 11/184
280/124.13

FOREIGN PATENT DOCUMENTS

| CN | 106627011 A | * | 5/2017 | ............... B60G 3/14 |
| KR | 20040101795 A | | 12/2004 | |
| KR | 20230112335 A | * | 7/2023 | |

OTHER PUBLICATIONS

Translation of CN-106627011-A.*
Translation of KR-20230112335-A.*

* cited by examiner

*Primary Examiner* — Paul N Dickson
*Assistant Examiner* — Shams Dhanani
(74) *Attorney, Agent, or Firm* — Slater Matsil, LLP

(57) ABSTRACT

An embodiment suspension system for a vehicle includes a rocker arm housing coupled to a first end of a lower arm through which a rotation axis passes, a rocker arm having a first end surrounded by the rocker arm housing and a second end disposed toward a center of the rocker arm housing, the rocker arm being rotatable together with the lower arm about the rotation axis, a torsion bar having a first end connected to the second end of the rocker arm and a second end extending along the rotation axis and then coupled to a vehicle body connection member, and a contact protrusion disposed on either the rocker arm housing or the rocker arm, the contact protrusion being configured to come into contact with the other of the rocker arm and the rocker arm housing in accordance with a rotation angle of the rocker arm housing.

20 Claims, 9 Drawing Sheets

SUSPENSION SYSTEM FOR VEHICLE

CROSS-REFERENCE TO RELATED APPLICATIONS

This application claims the benefit of Korean Patent Application No. 10-2023-0104902, filed on Aug. 10, 2023, which application is hereby incorporated herein by reference.

TECHNICAL FIELD

The present invention relates to a suspension system for a vehicle.

BACKGROUND

A suspension system for a vehicle refers to a device that connects an axle and a vehicle body and prevents vibration or impact applied from a road surface from being transmitted directly to a vehicle body while the vehicle travels, thereby preventing damage to the vehicle body or freight and improving ride quality.

The suspension system has a structure that absorbs impact by restricting a rotation of a lower arm by using a torsional force of a torsion bar when a wheel bumps.

However, the structure in the related art allows the torsion bar to always exhibit predetermined stiffness regardless of a rotation angle of the lower arm.

However, in the related art, the torsion bar is configured to absorb impact by always exhibiting a torsional force with a predetermined magnitude regardless of the rotation angle of the lower arm. That is, the torsion bar is configured to absorb impact by exhibiting single stiffness regardless of the rotation angle of the lower arm but hardly copes effectively with an excessive decrease in vehicle height when a vehicle weight greatly increases because of increases in the number of occupants and loaded items.

In the case of a vehicle such as a multi-purpose vehicle (MPV) in which weights of passengers and freight greatly fluctuate, a double stiffness spring is sometimes used to compensate for the decrease in excessive vehicle height. In this case, there is a problem in that costs are increased, and a layout for an installation space needs to be separately provided.

The foregoing explained as the background is intended merely to aid in the understanding of the background of embodiments of the present invention and is not intended to mean that embodiments of the present invention fall within the purview of the related art that is already known to those skilled in the art.

SUMMARY

The present invention relates to a suspension system for a vehicle. Particular embodiments relate to a technology related to a suspension system for a vehicle that absorbs impact by using a torsion bar that implements double stiffness when a lower arm rotates.

Embodiments of the present invention can solve problems in the art and aim to provide a suspension system for a vehicle in which a rocker arm housing and a structure of a rocker arm for transmitting a rotation of a lower arm to a torsion bar are improved, such that the torsion bar may exhibit torsional forces with different magnitudes depending on a rotation stroke of the lower arm, thereby absorbing impact by using the torsion bar that implements double stiffness.

In order to achieve the above-mentioned object, an embodiment of the present invention provides a suspension system for a vehicle that includes a rocker arm housing coupled to one end of a lower arm through which a rotation axis passes, a rocker arm having one end surrounded by the rocker arm housing and the other end disposed toward a center of the rocker arm housing, the rocker arm being configured to rotate together with the lower arm about the rotation axis, and a torsion bar having one end connected to the other end of the rocker arm and the other end extending along the rotation axis and then coupled to a vehicle body connection member, the torsion bar being configured to exhibit a torsional force by receiving a rotation of the lower arm through the rocker arm housing and the rocker arm in which a contact protrusion is provided on any one of the rocker arm housing and the rocker arm and configured to come into contact with the rocker arm or the rocker arm housing in accordance with a rotation angle of the rocker arm housing.

A spring stiffness of the torsion bar may be determined on the basis of a length of the rocker arm, an overall length of the torsion bar, and a diameter of the torsion bar, and the spring stiffness of the torsion bar may be inversely proportional to the length of the rocker arm and the overall length of the torsion bar and proportional to the diameter of the torsion bar.

The overall length of the torsion bar and the diameter of the torsion bar may be fixed factors that do not change in numerical values, the length of the rocker arm may be a variable factor that varies depending on whether the contact protrusion is in contact with the rocker arm, and when the contact protrusion is in contact with the rocker arm, the length of the rocker arm, which affects the spring stiffness of the torsion bar, may be decreased, and the spring stiffness of the torsion bar may increase as the length of the rocker arm decreases.

When the contact protrusion is not in contact with the rocker arm, the length of the rocker arm, which affects the spring stiffness of the torsion bar, may be an overall length from one end surrounded by the rocker arm housing to the other end coupled to the torsion bar.

When the contact protrusion is in contact with the rocker arm, the length of the rocker arm, which affects the spring stiffness of the torsion bar, may be a reduced length from a position at which the contact protrusion is in contact with the rocker arm to the other end coupled to the torsion bar.

Rocker arm insertion grooves may be radially disposed in the rocker arm housing, and one end of the rocker arm may be inserted into the rocker arm insertion groove, such that one end of the rocker arm is installed to be surrounded by the rocker arm insertion groove.

The contact protrusion may be formed to protrude toward the rocker arm from an inlet side of the rocker arm insertion groove.

The contact protrusion may be formed to protrude toward the rocker arm only from any one side at an inlet side of the rocker arm insertion groove so that the contact protrusion comes into contact with the rocker arm when the rocker arm housing is rotated by a bump operation of a wheel.

A time point at which the contact protrusion comes into contact with the rocker arm may be defined as a reference time point, a line which connects centers of two opposite ends of the rocker arm at the reference time point may be defined as a centerline, a line which is connected to an end of the contact protrusion in a direction perpendicular to the centerline may be defined as a reference line, and a time point of contact between the contact protrusion and the rocker arm may be advanced from the reference time point and a time point of a change in stiffness of the torsion bar may be advanced from the reference time point as the end of the contact protrusion is positioned to be closer to the other end connected to the torsion bar by passing over the reference line.

A time point at which the contact protrusion comes into contact with the rocker arm may be defined as a reference time point, a line which connects centers of two opposite ends of the rocker arm at the reference time point may be defined as a centerline, and a line which is connected to an end of the contact protrusion in a direction perpendicular to the centerline may be defined as a reference line, and a time point of contact between the contact protrusion and the rocker arm may be retarded from the reference time point and a time point of a change in stiffness of the torsion bar may be retarded from the reference time point as the end of the contact protrusion is positioned to be closer to one end connected to the rocker arm housing without passing over the reference line.

The suspension system may further include a connector connected to the other end of the lower arm through which the rotation axis passes, the connector being configured to rotate together with the lower arm about the rotation axis. The vehicle body connection member includes a first fixing plate coupled to the rocker arm housing by means of a first bearing and assembled with the other end of the rocker arm, a second fixing plate coupled to the connector by means of a second bearing, and a central shaft configured to connect the first fixing plate and the second fixing plate and configured such that a connection bracket connected to a vehicle body is coupled to the central shaft.

The suspension system according to an embodiment of the present invention is configured such that the contact protrusion is provided on the rocker arm housing configured to transmit the rotation of the lower arm to the torsion bar, and the contact protrusion comes into contact with the rocker arm in accordance with the rotation strokes of the lower arm and the rocker arm housing when the wheel bumps, such that the length of the rocker arm, which affects the spring stiffness of the torsion bar, may vary. Therefore, the torsion bar exhibits the torsional forces with different magnitudes when the wheel fully bumps, which makes it possible to implement the double stiffness of the torsion bar.

In addition, the suspension system according to an embodiment of the present invention may implement the double stiffness of the torsion bar and thus be applied to the vehicle in which weights of passengers and freight greatly fluctuate. Therefore, it is possible to prevent an excessive decrease in vehicle height and thus further improve the durability of the suspension system.

DETAILED DESCRIPTION OF ILLUSTRATIVE EMBODIMENTS

Figure 1:
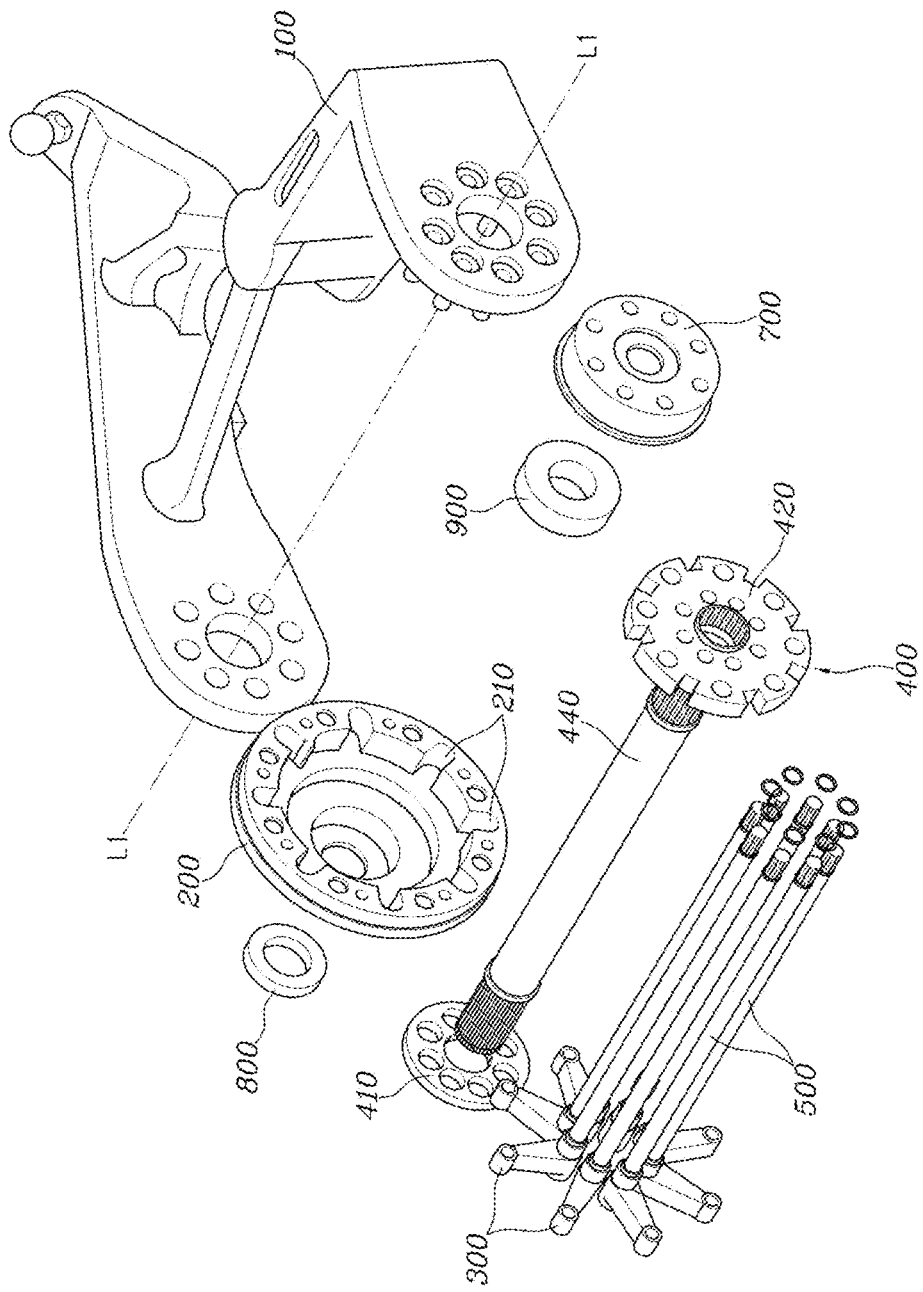
FIG. 1 is an exploded view of a suspension system for a vehicle according to an embodiment of the present invention.
Figure 2:
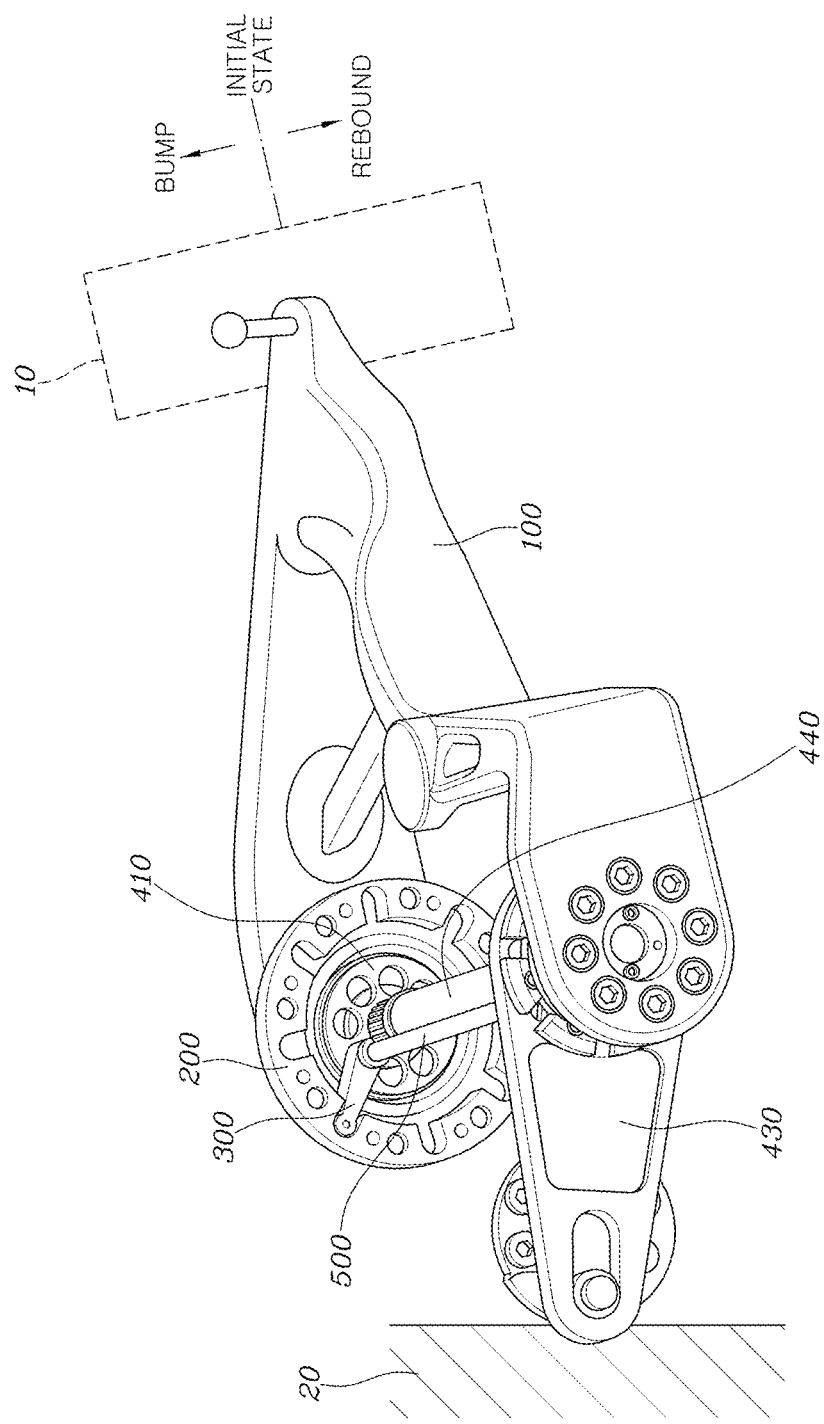
FIG. 2 is a coupled state view of FIG. 1.

Hereinafter, embodiments disclosed in the present specification will be described in detail with reference to the accompanying drawings. The same or similar constituent elements are assigned with the same reference numerals regardless of figure numbers, and the repetitive description thereof will be omitted.

The suffixes "module", "unit", "part", and "portion" used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification.

In addition, it should be interpreted that the accompanying drawings are provided only to allow those skilled in the art to easily understand the embodiments disclosed in the present specification, and the technical spirit disclosed in the present specification is not limited by the accompanying drawings and includes all alterations, equivalents, and alternatives that are included in the spirit and the technical scope of embodiments of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements.

When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

In addition, the term "control unit" or "unit" included in the name of "motor control unit (MCU)" or "hybrid control unit (HCU)" is merely a term widely used to name a control device (controller or control unit) for controlling a particular vehicle function but does not mean a generic function unit.

A controller may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, a suspension system for a vehicle according to an exemplary embodiment of the present invention will be described with reference to the accompanying drawings.

As illustrated in FIGS. 1 to 9, a suspension system for a vehicle according to an embodiment of the present invention includes a rocker arm housing 200 coupled to one end of a lower arm 100 through which a rotation axis L1 passes, the rocker arm housing 200 being configured to rotate together with the lower arm 100 about the rotation axis L1, rocker arms 300 each having one end surrounded by the rocker arm housing 200 and the other end disposed toward a center of the rocker arm housing 200, and torsion bars 500 each having one end connected to the other end of each of the rocker arms 300 and the other end extending along the rotation axis L1 and then coupled to a vehicle body connection member 400, the torsion bars 500 being configured to exhibit torsional forces by receiving a rotation of the lower arm 100 through the rocker arm housing 200 and the rocker arms 300. A contact protrusion 600 is provided on any one of the rocker arm housing 200 and the rocker arm 300 and configured to come into contact with the rocker arm 300 or the rocker arm housing 200 in accordance with a rotation angle of the rocker arm housing 200.

The lower arm 100 has an A-shaped external shape having three ends. Any one end is coupled to a wheel 10 of the vehicle by means of a ball joint, and the remaining two ends are connected to a vehicle body 20.

A wheel 10 bumps and rebounds based on an initial state. When the wheel 10 bumps and rebounds, the lower arm 100 rotates clockwise or counterclockwise about the rotation axis L1 that penetrates centers of the remaining two ends.

The rocker arm housing 200 is coupled to one end of the lower arm 100, which is one of the remaining two ends through which the rotation axis L1 passes, and the rocker arm housing 200 rotates together with the lower arm 100 when the lower arm 100 rotates.

According to an embodiment of the present invention, rocker arm insertion grooves 210 are radially disposed in the rocker arm housing 200, and one end of the rocker arm 300 is inserted into the rocker arm insertion groove 210. Therefore, one end of the rocker arm 300 is installed in a state of being surrounded by the rocker arm insertion groove 210.

The other end of the rocker arm 300, which is disposed toward the center of the rocker arm housing 200, is coupled to one end of the torsion bar 500, the torsion bar 500 extends along the rotation axis L1, and the other end of the torsion bar 500 is fixedly coupled to the vehicle body connection member 400.

Therefore, the lower arm 100 is rotated about the rotation axis L1 by the bump and rebound operations of the wheel 10, and the rocker arm housing 200 rotates together with the lower arm 100. When one end of the rocker arm 300 inserted into the rocker arm insertion groove 210 rotates, the torsion bar 500, which has the two opposite ends that connect the rocker arm 300 and the vehicle body connection member 400, exhibits the torsional force by performing a torsional operation by the rotation of the rocker arm 300, and the torsional force of the torsion bar 500 may be used to absorb impact.

The contact protrusion 600 may be formed on any one of the rocker arm housing 200 and the rocker arm 300. In the embodiment according to the present invention, a structure will be basically described in which the contact protrusion 600 is formed on the rocker arm housing 200 and comes into contact with the rocker arm 300 when the rocker arm housing 200 rotates.

In case that the contact protrusion 600 is formed on the rocker arm 300, the contact protrusion 600 comes into contact with the rocker arm housing 200 when the rocker arm housing 200 rotates.

In the embodiment according to the present invention, a length of the rocker arm 300, which affects a spring stiffness of the torsion bar 500, may vary depending on the contact between the contact protrusion 600 and the rocker arm 300 in accordance with a rotation stroke of the lower arm 100. Therefore, the torsion bar 500 may implement spring stiffnesses K (torsional forces) with different magnitudes.

That is, the spring stiffness K (torsional force) of the torsion bar 500 is determined on the basis of a length of the rocker arm 300, an overall length L2 of the torsion bar 500, and a diameter D1 of the torsion bar 500. The spring stiffness of the torsion bar 500 is inversely proportional to the length of the rocker arm 300 and the overall length L2 of the torsion bar 500 and proportional to the diameter D1 of the torsion bar 500.

In this case, the overall length L2 of the torsion bar 500 and the diameter D1 of the torsion bar 500 are fixed factors that do not change in numerical values.

The overall length L2 of the torsion bar 500 is a length from one end, which is coupled to the other end of the rocker arm 300, to the other end coupled to the vehicle body connection member 400.

Further, the length of the rocker arm 300 is a variable factor that varies depending on whether the contact protrusion 600 is in contact with the rocker arm 300.

That is, when the contact protrusion 600 is not in contact with the rocker arm 300, the length of the rocker arm 300, which affects the spring stiffness K of the torsion bar 500, is an overall length L3 from one end, which is surrounded by the rocker arm housing 200, to the other end coupled to the torsion bar 500.

In this case, the factors which affect the spring stiffness K of the torsion bar 500 are the overall length L3 of the rocker arm 300, the overall length L2 of the torsion bar 500, and the diameter D1 of the torsion bar 500.

However, when the contact protrusion 600 is in contact with the rocker arm 300, the length of the rocker arm 300, which affects the spring stiffness K of the torsion bar 500, is a reduced length L4 from a position at which the contact protrusion 600 is in contact with the rocker arm 300 to the other end coupled to the torsion bar 500.

In this case, the factors, which affect the spring stiffness K of the torsion bar 500 are the reduced length L4 of the rocker arm 300, the overall length L2 of the torsion bar 500, and the diameter D1 of the torsion bar 500.

When the contact protrusion 600 comes into contact with the rocker arm 300 when the lower arm 100 and the rocker arm housing 200 are rotated by the bump operation of the wheel 10, the length of the rocker arm 300, which affects the spring stiffness K of the torsion bar 500, is decreased to the reduced length L4. The spring stiffness K of the torsion bar 500 increases as the length of the rocker arm 300 decreases. The higher spring stiffness K of the torsion bar 500 may prevent an excessive decrease in vehicle height, thereby further improving the durability of the suspension system.

The contact protrusion 600 of the embodiment according to the present invention is structured to protrude toward the rocker arm 300 from an inlet side of the rocker arm insertion groove 210.

That is, the contact protrusion 600 is structured to protrude toward the rocker arm 300 only from any one side at the inlet side of the rocker arm insertion groove 210 so that the contact protrusion 600 may come into contact with the rocker arm 300 only when the rocker arm housing 200 is rotated by the bump operation of the wheel 10. In the drawings according to an embodiment of the present invention, the contact protrusion 600 is formed only at the inlet side of the rocker arm insertion groove 210 at the upper side based on the rocker arm 300.

Figure 3:
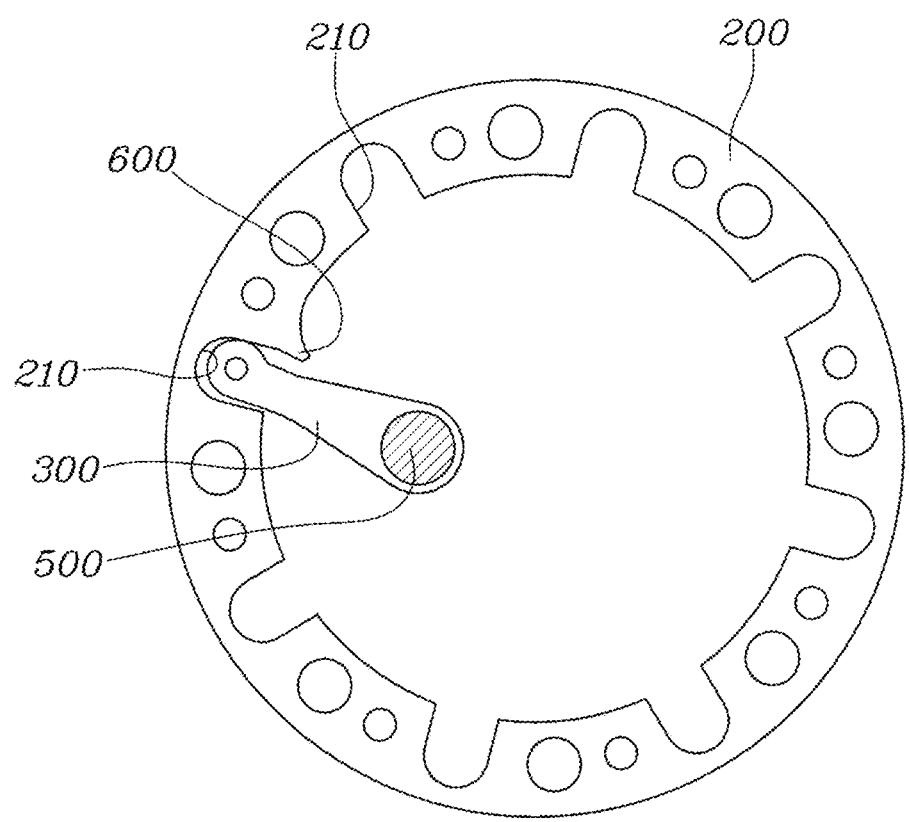
FIG. 3 is a view illustrating an initial state in which a wheel does not bump and rebound.
Figure 4:
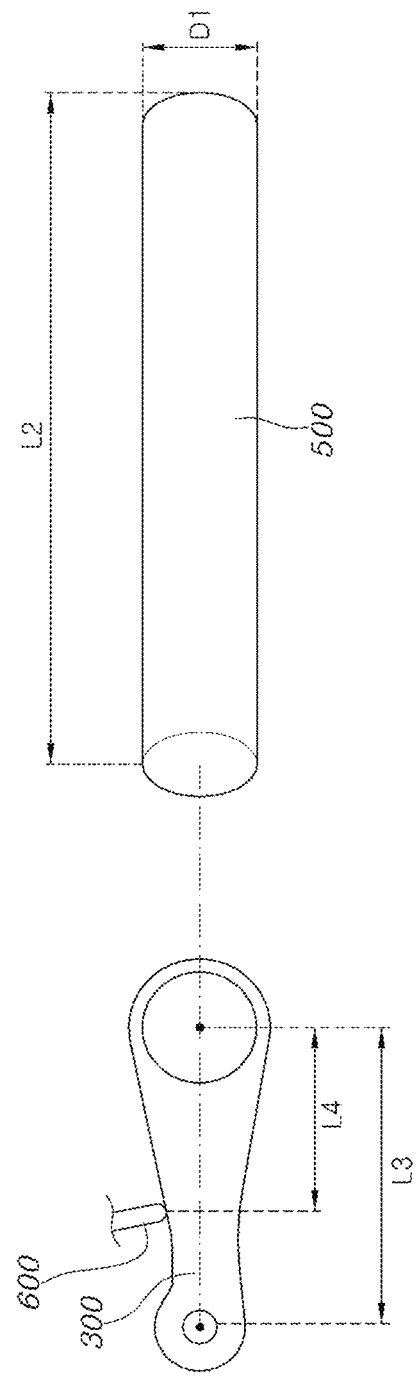
FIG. 4 is a view for explaining an element for determining a spring constant of a torsion beam.
Figure 5:
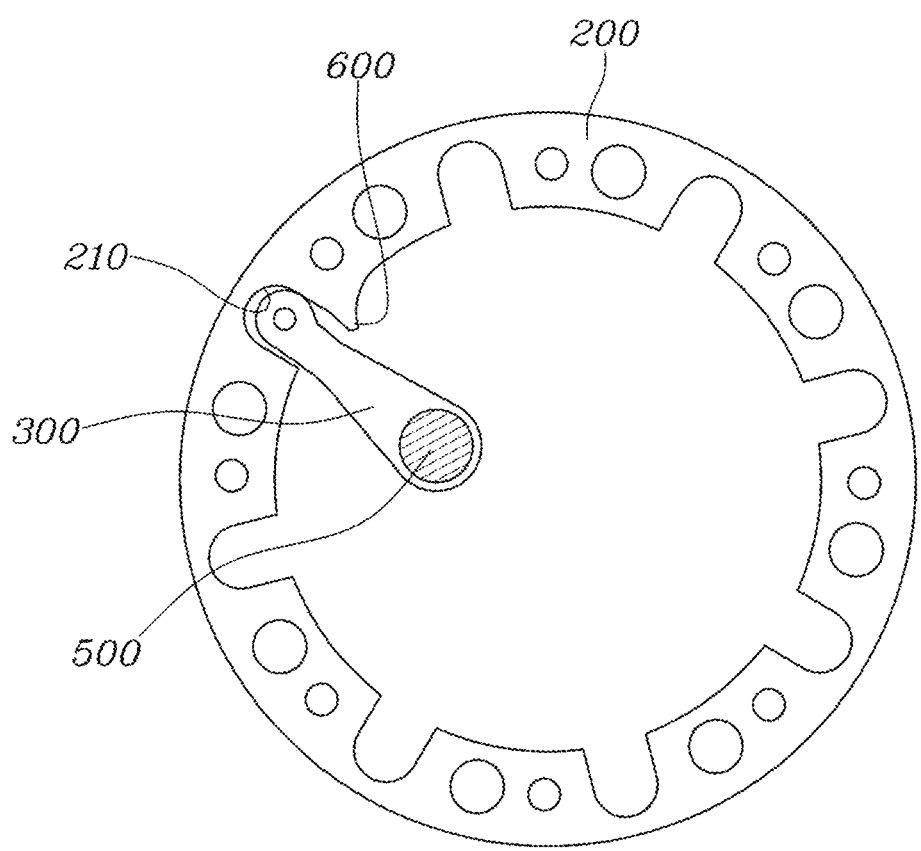
FIG. 5 is a view illustrating a state in which the wheel fully rebounds.

FIG. 3 illustrates an initial state in which the wheel 10 does not bump and rebound, and FIG. 5 is a view illustrating a state in which the wheel 10 fully rebounds. In the initial state in FIG. 3 and the fully rebounding state in FIG. 5, the contact protrusion 600 does not come into contact with the rocker arm 300. In this case, the length of the rocker arm 300, which affects the spring stiffness K of the torsion bar 500, is the overall length L3 from one end to the other end.

Figure 9:
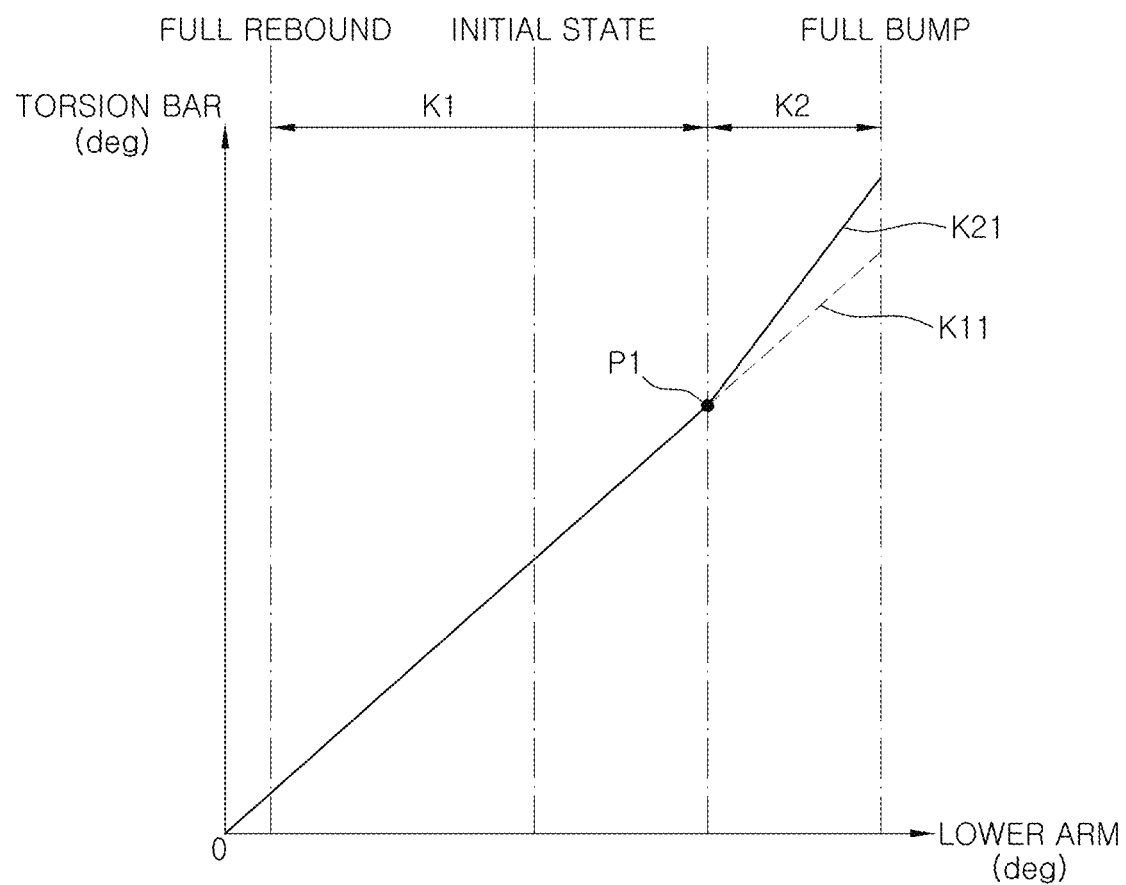
FIG. 9 is a graph for explaining a spring constant of the torsion beam according to an embodiment of the present invention.

With reference to the graph in FIG. 9, when the wheel 10 changes from the initial state to the fully rebounding state, a spring stiffness K11 of the torsion bar 500 may be expressed in a graph of a single stiffness that linearly increases.

Figure 6:
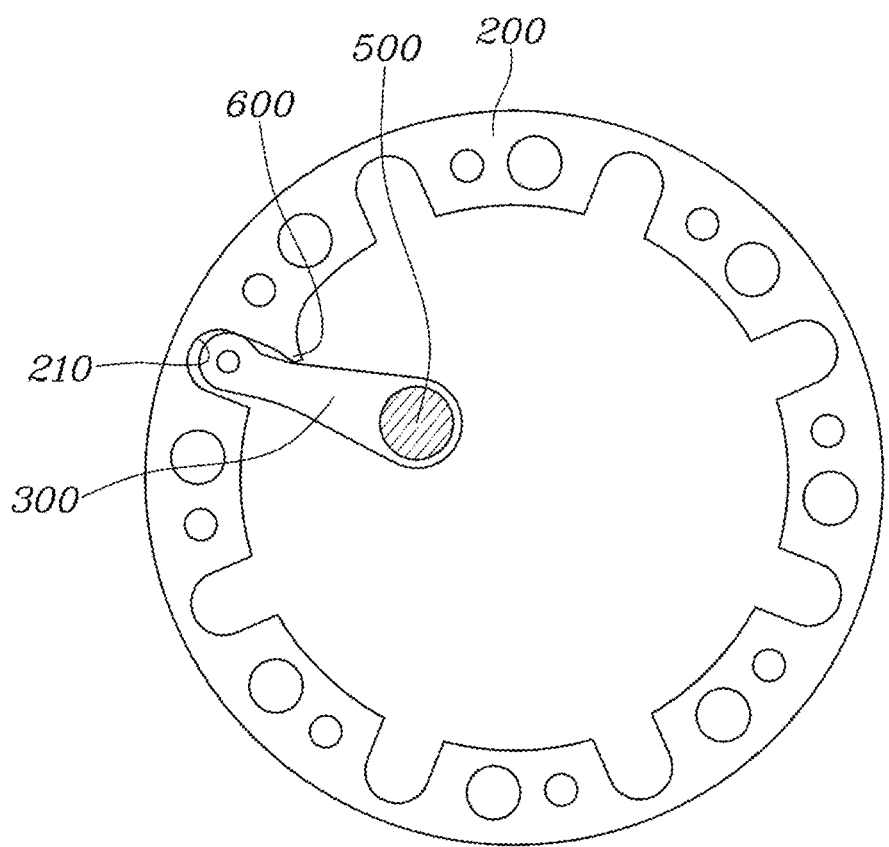
FIG. 6 is a view illustrating a time point at which the wheel bumps and a contact protrusion comes into contact with a rocker arm.
Figure 7:
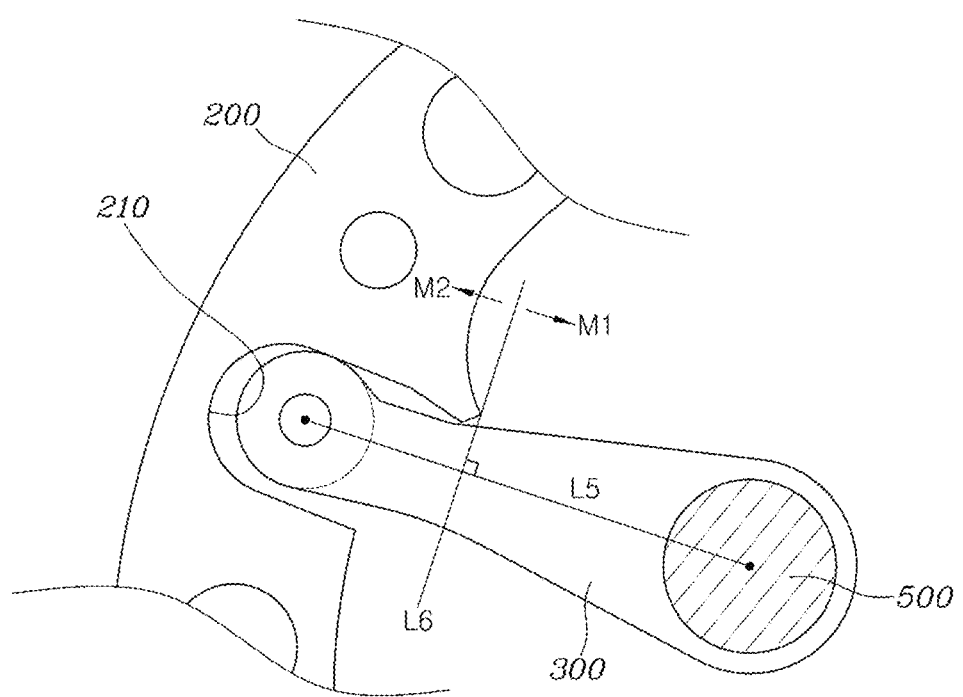
FIG. 7 is an enlarged view of FIG. 6.
Figure 8:
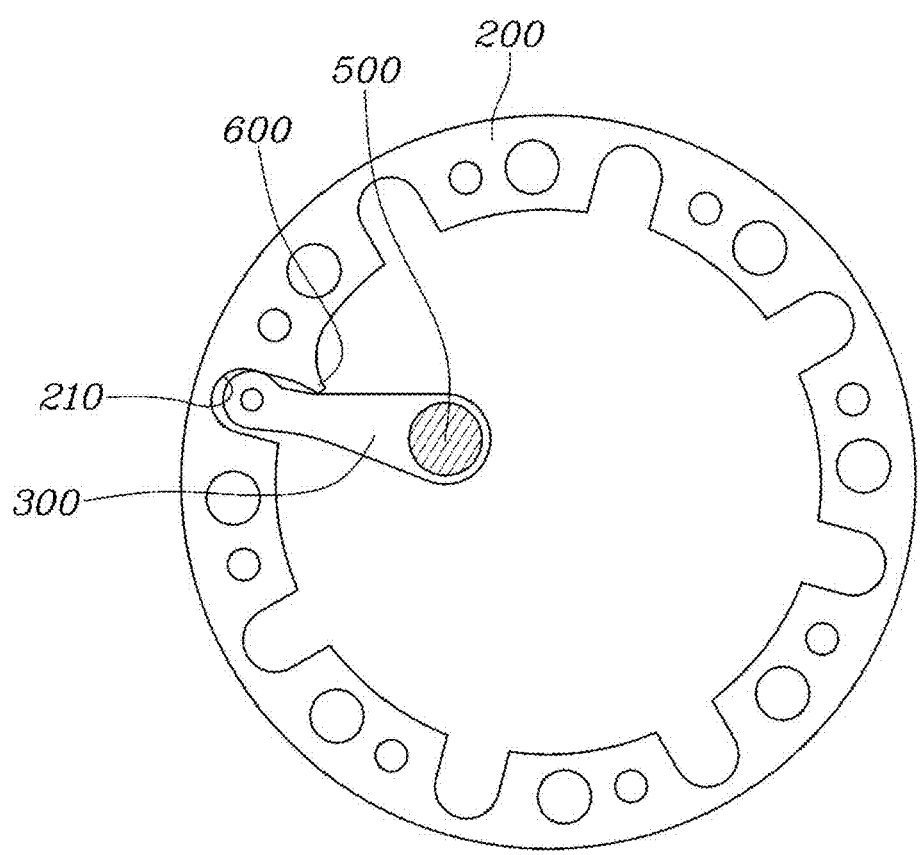
FIG. 8 is a view illustrating a state in which the wheel fully bumps.

FIG. 6 is a view illustrating a time point at which the wheel 10 bumps and the contact protrusion 600 is brought into contact with the rocker arm 300 by the rotation of the rocker arm housing 200, FIG. 7 is an enlarged view of FIG. 6, and FIG. 8 is a view illustrating a state in which the wheel fully bumps.

With reference to the graph in FIG. 9, when the wheel 10 changes from the initial state to the fully bumping state, a spring stiffness K21 of the torsion bar 500 is expressed in a graph of double stiffness in which the spring stiffness linearly increases and then rapidly increases after an inflection point P1 at any time point.

That is, when the wheel 10 bumps in the initial state, the contact protrusion 600 does not come into contact with the rocker arm 300 until the lower arm 100 and the rocker arm housing 200 rotate by a predetermined angle. In this case, the length of the rocker arm 300, which affects a spring stiffness K1 of the torsion bar 500, is the overall length L3 from one end to the other end.

At the moment when the contact protrusion 600 comes into contact with the rocker arm 300 as the bump operation is continuously performed and the rocker arm housing 200 continuously rotates, the length of the rocker arm 300, which affects a spring stiffness K2 of the torsion bar 500, is the reduced length L4 from the position at which the contact protrusion 600 is in contact with the rocker arm 300 to the other end coupled to the torsion bar 500. A spring stiffness K2 of the torsion bar 500 increases from this point.

That is, the torsion bar 500 exhibits the single spring stiffness K1 until the contact protrusion 600 comes into contact with the rocker arm 300 when the wheel 10 bumps. The torsion bar 500 exhibits the increased spring stiffness K2 from the inflection point P1 at which the contact protrusion 600 is in contact with the rocker arm 300 to the fully bumping state. Therefore, even in a situation in which the weights of passengers and freight greatly fluctuate, an excessive decrease in vehicle height may be prevented, thereby further improving the durability of the suspension system.

With reference to FIG. 7, a time point at which the contact protrusion 600 is in contact with the rocker arm 300 is defined as a reference time point, a line which connects the centers of the two opposite ends of the rocker arm 300 at the reference time point is defined as a centerline L5, and a line which is connected to an end of the contact protrusion 600 in a direction perpendicular to the centerline L5 is defined as a reference line L6. The time point of the contact between the contact protrusion 600 and the rocker arm 300 is advanced from the reference time point as the end of the contact protrusion 600 is positioned to be closer to the other end connected to the torsion bar 500 by passing over the reference line L6 (a position in direction M1 in FIG. 7). Therefore, the time point of the change in stiffness of the torsion bar 500 may be tuned to be advanced from the reference time point.

On the contrary, the time point of the contact between the contact protrusion 600 and the rocker arm 300 is retarded from the reference time point as the end of the contact protrusion 600 is positioned to be closer to one end connected to the rocker arm housing 200 without passing over the reference line L6 (a position in direction M2 in FIG. 7). Therefore, the time point of the change in stiffness of the torsion bar 500 may be tuned to be retarded from the reference time point.

The embodiment according to the present invention further includes a connector 700 coupled to the other end of the lower arm 100 through which the rotation axis L1 passes, the connector 700 being configured to rotate together with the lower arm 100 about the rotation axis L1.

Further, the vehicle body connection member 400 may include a first fixing plate 410 coupled to the rocker arm housing 200 by a first bearing 800 and assembled with the other end of the rocker arm 300, a second fixing plate 420 coupled to the connector 700 by a second bearing 900, and a central shaft 440 configured to connect the first fixing plate 410 and the second fixing plate 420 and configured such that a connection bracket 430 connected to the vehicle body 20 is coupled to the central shaft 440.

An inner race of the first bearing 800 is coupled to the rocker arm housing 200 by press-fitting, and an outer race of the first bearing 800 is coupled to the vehicle body 20 by press-fitting.

An inner race of the second bearing 900 is coupled to the connector 700 by press-fitting, and an outer race of the second bearing 900 is coupled to the vehicle body 20 by press-fitting.

Two opposite ends of the central shaft 440 may be spline-coupled to central portions of the first and second fixing plates 410 and 420, and the connection bracket 430 may be coupled to connect the vehicle body 20 and the central shaft 440.

As described above, the suspension system according to an embodiment of the present invention is configured such that the contact protrusion 600 is provided on the rocker arm housing 200 configured to transmit the rotation of the lower arm 100 to the torsion bar 500, and the contact protrusion 600 comes into contact with the rocker arm 300 in accordance with the rotation strokes of the lower arm 100 and the rocker arm housing 200 when the wheel 10 bumps, such that the length of the rocker arm 300, which affects the spring stiffness of the torsion bar 500, may vary. Therefore, the torsion bar 500 exhibits the torsional forces with different magnitudes when the wheel 10 fully bumps, which makes it possible to implement the double stiffness of the torsion bar 500.

In addition, the suspension system according to an embodiment of the present invention may implement the double stiffness of the torsion bar 500 and thus be applied to the vehicle in which the weights of passengers and freight greatly fluctuate. Therefore, it is possible to prevent an excessive decrease in vehicle height and thus further improve the durability of the suspension system.

While the specific embodiments of the present invention have been illustrated and described, it will be obvious to those skilled in the art that the embodiments of the present invention may be variously modified and changed without departing from the technical spirit of the embodiments of the present invention defined in the appended claims.

What is claimed is:

1. A suspension system for a vehicle, the suspension system comprising:
   a rocker arm housing coupled to a first end of a lower arm through which a rotation axis passes;
   a rocker arm having a first end surrounded by the rocker arm housing and a second end disposed toward a center of the rocker arm housing, the rocker arm being configured to rotate together with the lower arm about the rotation axis;
   a torsion bar having a first end connected to the second end of the rocker arm and a second end extending alongside the rotation axis and then coupled to a vehicle body connection member, the torsion bar being configured to exhibit a torsional force by receiving a rotation of the lower arm through the rocker arm housing and the rocker arm; and
   a contact protrusion disposed on the rocker arm housing, the contact protrusion being configured to come into contact with a portion of the rocker arm in accordance with a rotation angle of the rocker arm housing.

2. The suspension system of claim 1, wherein:
   a spring stiffness of the torsion bar is determined based on a length of the rocker arm, an overall length of the torsion bar, and a diameter of the torsion bar; and
   the spring stiffness of the torsion bar is inversely proportional to the length of the rocker arm and the overall length of the torsion bar and proportional to the diameter of the torsion bar.

3. The suspension system of claim 2, wherein:
   the overall length of the torsion bar and the diameter of the torsion bar are fixed factors that do not change in numerical values and the length of the rocker arm is a variable factor that varies depending on whether the contact protrusion is in contact with the rocker arm; and
   in a state in which the contact protrusion is in contact with the rocker arm, the length of the rocker arm, which affects the spring stiffness of the torsion bar, is decreased, and the spring stiffness of the torsion bar increases as the length of the rocker arm decreases.

4. The suspension system of claim 1, wherein, in a state in which the contact protrusion is not in contact with the rocker arm, a length of the rocker arm, which affects a spring stiffness of the torsion bar, is an overall length from the first end surrounded by the rocker arm housing to the second end coupled to the torsion bar.

5. The suspension system of claim 1, wherein, in a state in which the contact protrusion is in contact with the rocker arm, a length of the rocker arm, which affects a spring stiffness of the torsion bar, is a reduced length from a position at which the contact protrusion is in contact with the rocker arm to the second end coupled to the torsion bar.

6. The suspension system of claim 1, further comprising rocker arm insertion grooves radially disposed in the rocker arm housing, wherein the first end of the rocker arm is inserted into a first rocker arm insertion groove of the rocker arm insertion grooves, such that the first end of the rocker arm is surrounded by the first rocker arm insertion groove.

7. The suspension system of claim 6, wherein the contact protrusion protrudes toward the rocker arm from an inlet side of the first rocker arm insertion groove.

8. The suspension system of claim 6, wherein the contact protrusion protrudes toward the rocker arm only from any one side at an inlet side of the first rocker arm insertion groove so that the contact protrusion comes into contact with the rocker arm when the rocker arm housing is rotated by a bump operation of a wheel.

9. The suspension system of claim 1, wherein:
   a time point at which the contact protrusion comes into contact with the rocker arm is defined as a reference time point;
   a first line which connects centers of two opposite ends of the rocker arm at the reference time point is defined as a centerline;
   a second line which is connected to an end of the contact protrusion in a direction perpendicular to the centerline is defined as a reference line; and
   a first time point of contact between the contact protrusion and the rocker arm is advanced from the reference time point and a second time point of a change in stiffness of the torsion bar is advanced from the reference time point as the end of the contact protrusion is positioned to be closer to the second end of the rocker arm connected to the torsion bar by passing over the reference line.

10. The suspension system of claim 1, wherein:
    a time point at which the contact protrusion comes into contact with the rocker arm is defined as a reference time point;
    a first line which connects centers of the first end and the second end of the rocker arm at the reference time point is defined as a centerline, the second end being opposite the first end;
    a second line which is connected to an end of the contact protrusion in a direction perpendicular to the centerline is defined as a reference line; and
    wherein a first time point of contact between the contact protrusion and the rocker arm is retarded from the reference time point and a second time point of a change in stiffness of the torsion bar is retarded from the reference time point as the end of the contact protrusion is positioned to be closer to the first end of the rocker arm connected to the rocker arm housing without passing over the reference line.

11. The suspension system of claim 1, further comprising a connector connected to a second end of the lower arm through which the rotation axis passes, the connector being configured to rotate together with the lower arm about the rotation axis.

12. The suspension system of claim 11, wherein the vehicle body connection member comprises:
    a first fixing plate coupled to the rocker arm housing by a first bearing and assembled with the second end of the rocker arm;
    a second fixing plate coupled to the connector by a second bearing; and
    a central shaft connecting the first fixing plate and the second fixing plate and configured to be coupled to a connection bracket connected to a vehicle body.

13. A vehicle comprising:
    a vehicle body;

a lower arm having an A-shaped external shape with three ends, wherein a first end is connected to the vehicle body, a second end is connected to the vehicle body, and a third end is coupled to a wheel of the vehicle;

a rocker arm housing coupled to the first end of the lower arm through which a rotation axis passes;

a rocker arm having a first end surrounded by the rocker arm housing and a second end disposed toward a center of the rocker arm housing, the rocker arm being configured to rotate together with the lower arm about the rotation axis;

a torsion bar having a first end connected to the second end of the rocker arm and a second end extending alongside the rotation axis and then coupled to a vehicle body connection member, the torsion bar being configured to exhibit a torsional force by receiving a rotation of the lower arm through the rocker arm housing and the rocker arm; and a contact protrusion disposed on the rocker arm housing, the contact protrusion being configured to come into contact with a portion of the rocker arm in accordance with a rotation angle of the rocker arm housing.

14. The vehicle of claim 13, wherein:

a spring stiffness of the torsion bar is determined based on a length of the rocker arm, an overall length of the torsion bar, and a diameter of the torsion bar; and the spring stiffness of the torsion bar is inversely proportional to the length of the rocker arm and the overall length of the torsion bar and proportional to the diameter of the torsion bar.

15. The vehicle of claim 14, wherein:

the overall length of the torsion bar and the diameter of the torsion bar are fixed factors that do not change in numerical values and the length of the rocker arm is a variable factor that varies depending on whether the contact protrusion is in contact with the rocker arm; and in a state in which the contact protrusion is in contact with the rocker arm, the length of the rocker arm, which affects the spring stiffness of the torsion bar, is decreased, and the spring stiffness of the torsion bar increases as the length of the rocker arm decreases.

16. The vehicle of claim 13, wherein, in a state in which the contact protrusion is not in contact with the rocker arm, a length of the rocker arm, which affects a spring stiffness of the torsion bar, is an overall length from the first end surrounded by the rocker arm housing to the second end coupled to the torsion bar.

17. The vehicle of claim 13, wherein, in a state in which the contact protrusion is in contact with the rocker arm, a length of the rocker arm, which affects a spring stiffness of the torsion bar, is a reduced length from a position at which the contact protrusion is in contact with the rocker arm to the second end coupled to the torsion bar.

18. The vehicle of claim 13, further comprising rocker arm insertion grooves radially disposed in the rocker arm housing, wherein the first end of the rocker arm is inserted into a first rocker arm insertion groove of the rocker arm insertion grooves, such that the first end of the rocker arm is surrounded by the first rocker arm insertion groove.

19. The vehicle of claim 13, wherein:

a time point at which the contact protrusion comes into contact with the rocker arm is defined as a reference time point;

a first line which connects centers of two opposite ends of the rocker arm at the reference time point is defined as a centerline;

a second line which is connected to an end of the contact protrusion in a direction perpendicular to the centerline is defined as a reference line; and a first time point of contact between the contact protrusion and the rocker arm is advanced from the reference time point and a second time point of a change in stiffness of the torsion bar is advanced from the reference time point as the end of the contact protrusion is positioned to be closer to the second end of the rocker arm connected to the torsion bar by passing over the reference line.

20. The vehicle of claim 13, wherein:

a time point at which the contact protrusion comes into contact with the rocker arm is defined as a reference time point;

a first line which connects centers of the first end and the second end of the rocker arm at the reference time point is defined as a centerline, the second end being opposite the first end;

a second line which is connected to an end of the contact protrusion in a direction perpendicular to the centerline is defined as a reference line; and wherein a first time point of contact between the contact protrusion and the rocker arm is retarded from the reference time point and a second time point of a change in stiffness of the torsion bar is retarded from the reference time point as the end of the contact protrusion is positioned to be closer to the first end of the rocker arm connected to the rocker arm housing without passing over the reference line.

* * * * *